Dec. 17, 1929.  R. P. DUNMIRE  1,739,953
CONDUIT FITTING
Filed Oct. 30, 1925
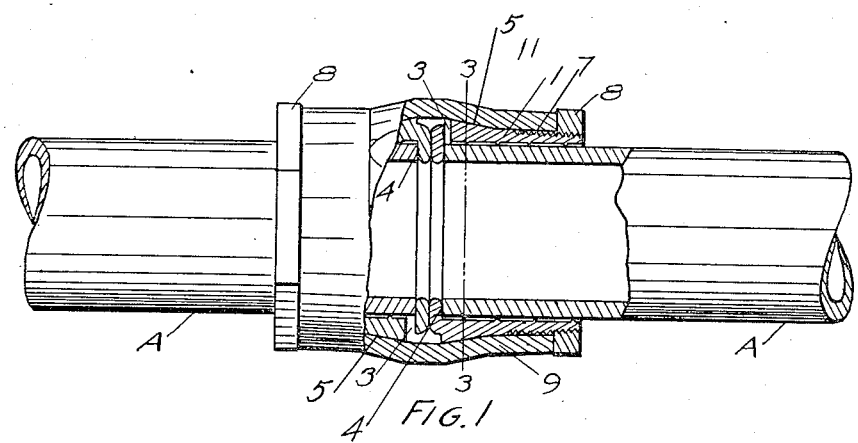
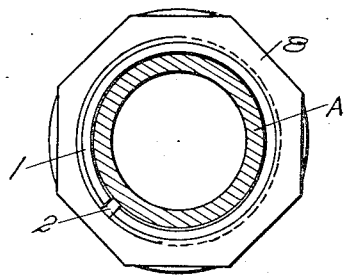
FIG. 2.
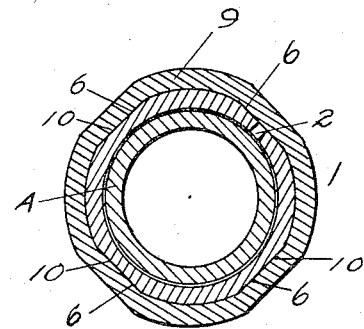
FIG. 3.
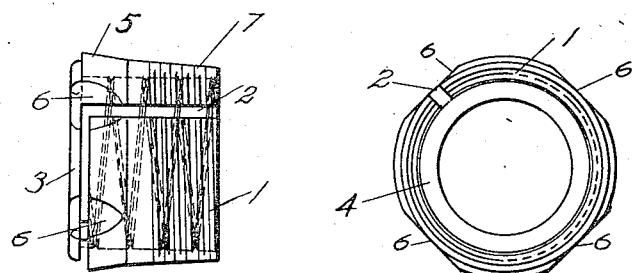
FIG. 4.
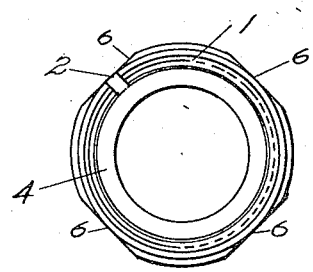
FIG. 5.
INVENTOR.
Russell P. Dunmire
BY
ATTORNEYS.

Patented Dec. 17, 1929

1,739,953

UNITED STATES PATENT OFFICE

RUSSELL P. DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed October 30, 1925. Serial No. 65,823.

This invention is designed to improve conduit fittings for use with threadless conduit. Conduit fittings have heretofore been designed in which the contractible sleeves are used for engaging the conduit. These sleeves have been slit longitudinally and in some cases longitudinally and circumferentially forming an L-shaped slot and are provided with a guard shoulder at their inner ends. These contractible sleeves have been formed with tapered outer surfaces, a part of the surface being out of round and are drawn into the openings which, as they are drawn in, contract the sleeves into clamping engagement with an inserted conduit. The present invention utilizes contracting sleeves of this type in the formation of couplings. Features and details of the invention will appear from the specification and claim.

The invention is illustrated in the accompanying drawings as follows:—

Fig. 1 shows a side elevation, partly in section.

Fig. 2 is an end view of the coupling.

Fig. 3 is a section on the line 3—3 in Fig. 1.

Fig. 4 is a side elevation of a contractible sleeve.

Fig. 5 is an end view of such sleeve.

1 marks the contractible sleeve. This has a longitudinal slit 2 terminating in a circumferential slit 3. It has an inwardly extending guard shoulder 4 at its inner end and this is a complete annulus so as to obviate any cutting edges on the inserted conduit. The sleeve has a tapered portion 5 with a series of flat surfaces 6. It is screw-threaded at its outer end at 7 and provided with a nut 8. So far this is a type of contractible sleeve heretofore designed.

The contractible sleeves are arranged end to end with the smaller ends extending outwardly and a coupling sleeve 9 is placed over these sleeves. This coupling sleeve has the flat portions 10 corresponding to the flat portions 6 on the contractible sleeves and is internally tapered at 11 corresponding to the taper of the contractible sleeve. This coupling is ordinarily formed by placing a tube over the contractible sleeves and compressing the outer portions of the coupling sleeve to the smaller form preferably conforming to the contractible sleeves. Conduits A are placed in the contractible sleeves against the guard shoulder and by tightening the nuts 8 the contracting sleeves are drawn outwardly thus contracting them through the wedging action of the tapered surfaces into clamping engagement with the conduit.

What I claim as new is:—

In a conduit fitting, the combination of two slotted contractible sleeves having tapered outer surfaces, said sleeves being placed end to end with their smaller ends extending outwardly and with their larger ends closely adjacent; an integral coupling sleeve formed of annularly integral walls being larger at the center than at the ends and extending over the contractible sleeves and engaging the tapered surfaces, the contractible sleeves extending outwardly beyond the end of the coupling sleeve; and means on the outer ends of the contractible sleeves drawing them outwardly to close them on an inserted conduit.

In testimony whereof I have hereunto set my hand.

RUSSELL P. DUNMIRE.